United States Patent
Huth et al.

(10) Patent No.: US 8,708,229 B1
(45) Date of Patent: Apr. 29, 2014

(54) SYSTEMS AND METHODS FOR CUSTOMIZED DEPOSIT SLIPS

(71) Applicant: Unites Services Automobile Association (USAA), San Antonio, TX (US)

(72) Inventors: Troy Bartlette Huth, La Vernia, TX (US); Ryan Ray Barth, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/669,215

(22) Filed: Nov. 5, 2012

Related U.S. Application Data

(63) Continuation of application No. 12/796,310, filed on Jun. 8, 2010, now Pat. No. 8,302,853, which is a continuation of application No. 11/322,913, filed on Dec. 30, 2005, now Pat. No. 7,743,978.

(51) Int. Cl.
*G06Q 40/00* (2012.01)

(52) U.S. Cl.
USPC .......................................... 235/379; 235/381

(58) Field of Classification Search
USPC ................................ 235/379, 381; 705/71, 75
See application file for complete search history.

(56) References Cited

U.S. PATENT DOCUMENTS

| | | | |
|---|---|---|---|
| 3,778,596 | A | 12/1973 | Wapner |
| 4,038,523 | A | 7/1977 | Widmer et al. |
| 5,097,517 | A | 3/1992 | Holt |
| 5,415,341 | A | 5/1995 | Diamond |
| 5,630,073 | A | 5/1997 | Nolan |
| 5,966,698 | A | 10/1999 | Pollin |
| 6,626,357 | B1 | 9/2003 | Ross |
| 7,743,978 | B1 | 6/2010 | Huth et al. |
| 2002/0077971 | A1 | 6/2002 | Allred |
| 2005/0049950 | A1 | 3/2005 | Johnson |
| 2005/0108164 | A1 | 5/2005 | Salafia et al. |

OTHER PUBLICATIONS

1st Checks, "Deposit Slips—Free Shipping," 3 pages, 2005.
Cavion, LLC, "Stop Waiting On The Mail To Receive Credit For Your Deposits!," 1 page, 2005.
Compuchecks.com Corporation "QuickBooks™ Printable Deposit Slips," 2 pages, 1999.
Wasserman Medical, "EZ-DepositSlip™ Frequently Asked Questions," 3 pages, 2005.
Wasserman Medical, "EZ-DepositSlip™ Main Screen," 1 page, 2005.
File History for U.S. Appl. No. 11/322,500, filed Dec. 30, 2005.
File History for U.S. Appl. No. 11/322,913, filed Dec. 30, 2005.
File History for U.S. Appl. No. 12/781,537, filed May 17, 2010.

*Primary Examiner* — Ahshik Kim
(74) *Attorney, Agent, or Firm* — Perkins Coie LLP

(57) ABSTRACT

Systems and methods for customized deposit slips are described. The system comprises a first module to receive an account selection from a user for a bank account, a second module to create a representation of a deposit slip customized with an account number for the account selection, and a third module to post the deposit to the bank account identified by the account selection. Other embodiments may be described and claimed.

17 Claims, 6 Drawing Sheets

FIG. 7

SYSTEMS AND METHODS FOR CUSTOMIZED DEPOSIT SLIPS

CROSS-REFERENCES TO RELATED APPLICATIONS

This application is a continuation of U.S. patent application Ser. No. 12/796,310, filed Jun. 8, 2010, entitled "SYSTEMS AND METHODS FOR CUSTOMIZED DEPOSIT SLIPS," now allowed, which is a continuation of U.S. patent application Ser. No. 11/322,913, filed Dec. 30, 2005, entitled "SYSTEMS AND METHODS FOR CUSTOMIZED DEPOSIT SLIPS," now issued as U.S. Pat. No. 7,743,978, the entire disclosure of which is herein incorporated by reference for all purposes.

This application is related to U.S. application Ser. No. 11/322,500, titled "SYSTEMS AND METHODS FOR CUSTOMIZED DEPOSIT SLIPS" filed on Dec. 30, 2005, and U.S. application Ser. No. 12/781,537, titled "SYSTEMS AND METHODS FOR CUSTOMIZED DEPOSIT SLIPS" filed on May 17, 2010.

TECHNICAL FIELD

Various embodiments described herein relate to printed business forms generally, and more particularly to systems and methods for customized deposit slips.

BACKGROUND

Some banking institutions allow individuals to perform banking activities at home via the Internet. Some of these online banks are traditional banks that also offer online banking, while others are online only and have no physical presence. Account information from an online bank can be accessed anytime, day or night, and can be done from anywhere. When a customer is not near a bank, or if the bank operates entirely on-line, the customer may make deposits electronically or through the mail. When deposits are sent to a bank through the mail, a deposit slip is included to identify the customer and an account where the money is to be deposited. However, mail-in deposits often have incomplete or incorrect deposit slips. For example, some individuals do not write their full name on the deposit slip. Other individuals forget to write their account number on the deposit slip or they transpose digits in the account number when they copy it from their checkbook to a blank deposit slip. When deposit slips have incorrect or missing account information, or when no deposit slip is mailed with the deposit, a significant amount of time is involved to identify the account for the deposit.

SUMMARY

Systems and methods for customized deposit slips are described. The system comprises a first module to receive an account selection from a user for a bank account, a second module to create a representation of a deposit slip customized with an account number for the account selection, and a third module to post the deposit to the bank account identified by the account selection. Other embodiments are also described.

BRIEF DESCRIPTION OF THE DRAWINGS

FIG. 7 is a diagram of a representation of a customized deposit slip according to an embodiment.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
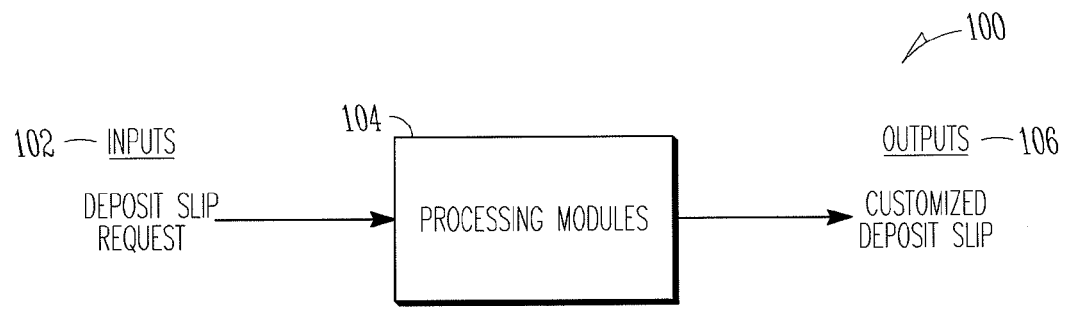
FIG. 1 is a block diagram of a customized deposit slip system according to various embodiments.

FIG. 1 comprises a block diagram of a customized deposit slip system 100 according to various embodiments. The system 100 comprises inputs 102, processing modules 104, and outputs 106.

The inputs 102 include a request by a user for one or more deposit slips. A deposit is money transferred to an account at a financial institution such as a bank. A deposit slip is any business form accompanying the deposit. The deposit slip may specify and categorize the funds (e.g. checks, bills, coins) being deposited. A user may request one or more customized deposit slips using an online banking system. Alternatively, the user may request customized deposit slips using other methods such as by telephone, by facsimile, by electronic mail (e-mail), by mail order, and so on.

The processing modules 104 generally include routines, programs, objects, components, data structures, etc., that perform particular functions or implement particular abstract data types. The processing modules 104 create customized deposit slips in response to the inputs 102. The processing modules 104 are described in more detail by reference to FIG. 2.

The outputs 106 include one or more customized deposit slips. The outputs 106 may be any deposit slip(s) created based on individual specifications. The deposit slips may be customized with any account information including, but not limited to, an account number, an individual's name and address, other identifiers for the individual such as a member number/ID, and the like. When the deposit slip is requested using an online banking system, the deposit slip may be customized with additional information about a particular deposit including, but not limited to, amount of the deposit, itemized list of the funds deposited, date of the deposit, and the like.

In some embodiments, the customized deposit slips may follow the American Bankers Association (ABA) and American National Standards Institute (ANSI) voluntary specification for bank forms. However, the customized deposit slips are not limited to these or other specifications. For example, in some embodiments, the deposits do not use magnetic ink or magnetic toner. In another example, the customized deposits slips do not use Magnetic Ink Character Recognition (MICR)

fonts. In yet another example, the customized deposit slips place the account number on the deposit slip in a location other than the MICR line.

Figure 2:
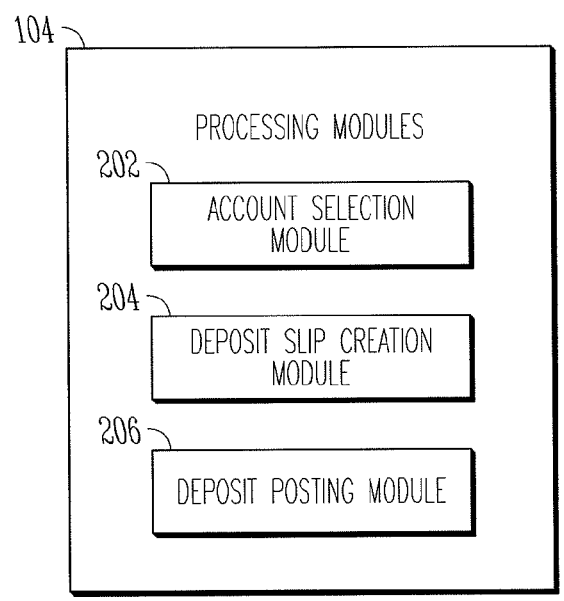
FIG. 2 is a block diagram of the processing modules of the system shown in FIG. 1 according to various embodiments.

FIG. 2 is a block diagram of the processing modules 104 of the system shown in FIG. 1 according to various embodiments. The processing modules 104 comprise a first module 202 to receive an account selection from a user for a bank account, a second module 204 to create a representation of a deposit slip customized with an account number for the account selection, and a third module 206 to post the deposit to the bank account identified by the account selection.

The first module 202 receives an account selection from a user for a bank account. In the example where the user is using an online banking system, the account selection may be provided as part of an account login process. In another example of an online banking system, the account selection may be made after the account login process is complete such as by selecting one of the user's accounts from a list or a menu or the like. If the user is not using an online banking system, the user may select an account by identifying the account by telephone (e.g., either verbally or through a touchtone system), or in writing by facsimile, e-mail, mail order form, and so on. In other words, the account selection may be any act that identifies the bank account in which the user intends to deposit funds.

The second module 204 creates a representation of a deposit slip customized with an account number for the account selection. In some embodiments, the representation of the deposit slip also includes, but is not limited to, amount of the deposit, itemized list of the funds deposited, date of the deposit, and the like. The representation of the deposit slip may be a computer-generated image of the deposit slip. The representation of the deposit slip may be used to print a deposit slip on paper with any type of a printer (e.g., a printout on a user's personal computer system). In alternate embodiments, the representation of the deposit slip may be delivered to a facsimile machine. A facsimile copy of the deposit slip is useful when a printer is unavailable to the user. In still other embodiments, the representation of the deposit slip may be used by a bank or by a third-party vendor to fulfill requests from a user for a supply of customized deposit slips. In some embodiments, the representation may be used to print customized fields that appear on a combined deposit slip/mailing envelope. Combined deposit slip/mailing envelopes are described in more detail by reference to FIGS. 5 and 6.

The third module 206 optionally posts the deposit amount to the bank account identified by the account selection. By posting the deposit amount, the deposit appears as a transaction in the bank account. In one embodiment, the deposit amount appears as a soft post meaning that the deposit appears in the account, but the funds may not be available to the user immediately.

Embodiments of the customized deposit slip system shown in FIGS. 1 and 2 reduce or eliminate the handwritten information on a deposit slip. This provides a useful result by decreasing the errors in the information on a deposit slip.

Methods

In this section, particular methods of example embodiments are described by reference to a series of flow charts. The methods to be performed constitute computer programs made up of computer-executable instructions.

Figure 3:
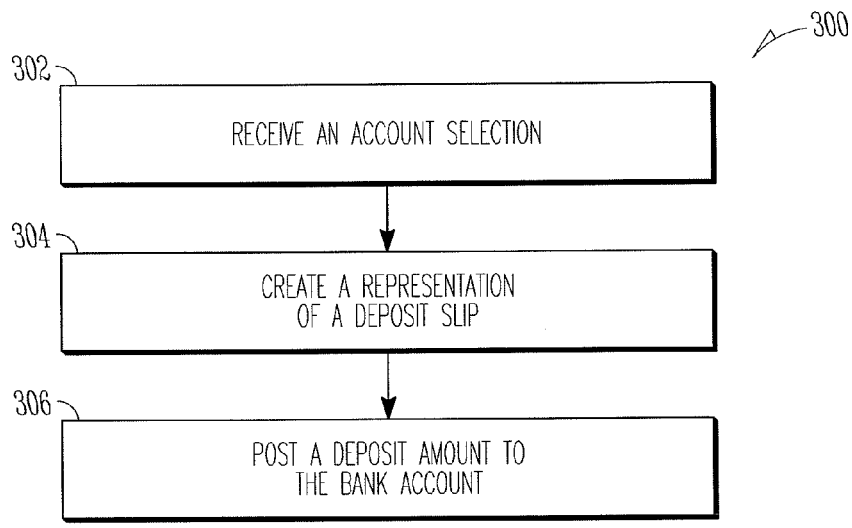
FIG. 3 is a flow diagram illustrating a method according to various embodiments.

FIG. 3 is a flow diagram illustrating a method 300 according to various embodiments. The method 300 begins when an account selection is received from a user for a bank account (block 302).

After the account selection is received, a representation of a deposit slip is created (block 304). The representation may be customized with an account number for the account selection. In some embodiments, the representation may have other account information or information about the particular deposit including, but not limited to, an account number, a user's name and/or mailing address, other identifiers for the user such as a member number, an amount of the deposit, an itemized list of the funds deposited, a date of the deposit, and the like.

In addition, the deposit amount is optionally posted to the bank account identified by the account selection (block 306). In some embodiments, the deposit amount may be posted as a soft post.

In alternate embodiments, the method 300 shown in FIG. 3 may also comprise calculating the deposit amount. For example, if the user itemizes the funds being deposited, then the total amount of the deposit is automatically calculated for the user and included as part of the representation of the deposit slip.

In another embodiment, the method 300 shown in FIG. 3 may also comprise including information not related to the deposit slip with the representation such as marketing information or customer information unrelated to the deposit itself.

Figure 4:
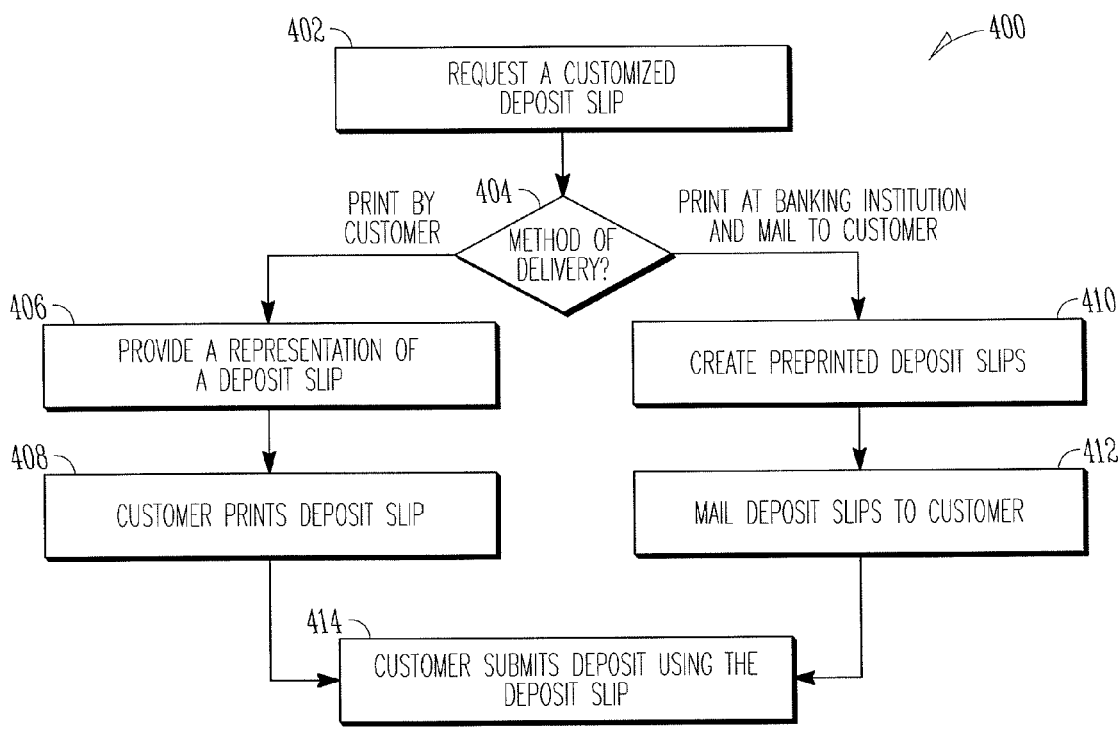
FIG. 4 is a more detailed flow diagram illustrating several methods according to various embodiments.

FIG. 4 is a more detailed flow diagram illustrating several methods according to various embodiments. The method shown in FIG. 4 begins with a request for a customized deposit slip (block 402). The request for the customized deposit slip may be for deposit slips only or may be for combined deposit slip envelopes. Combined deposit slip envelopes are described in more detail by reference to FIGS. 5 and 6.

The method of fulfilling the request may vary based on how the deposit slip will be delivered to the customer (block 404). In one embodiment, the customer may print the customized deposit slips. In another embodiment, a bank or third party vendor may print customized deposit slips as well as customized deposit slip envelopes.

If the customer is printing the customized deposit slip, a representation of the deposit slip is provided to the customer (block 406). In one embodiment, if the customer is signed on to an online bank account, the user may have the option to confirm that the account information in the representation of the deposit slip is correct prior to printing the customized deposit slip.

The customer then prints the customized deposit slip (block 408). In one embodiment, the customer may also print customized information on an envelope for mailing the deposit. For example, if the user is signed on to an online bank account and the user selects a print option, the user may be prompted for paper to print the deposit slip. If the user is also printing an envelope, the user may then be prompted to load an envelope to print the bank information on the envelope. Providing a customer the ability to print deposit slips and/or envelopes on request, allows a customer to submit deposits at any time. This method of delivery allows customers to receive a customized deposit slip at any time day or night. The customer does not have to wait for deposit slips to be printed and mailed as the customer may with other methods of delivery.

If the bank or third party vendor is printing the customized deposit slips, then the deposit slips are printed with the desired account information (block 410). The preprinted deposit slips are then mailed to the customer (block 412). Rather than receiving blank and non-personalized deposit slips, the customer receives preprinted deposit slips customized with account information.

The various methods illustrated in FIG. 4 permit the customer to submit a deposit using the customized deposit slip or the customized deposit slip envelope (block 414). In one embodiment, the deposit is submitted by mail. In another embodiment, the deposit is submitted by leaving it at a third-party drop-off point. In still another embodiment, the deposit is submitted directly to a bank's branch office.

Various methods for providing customized deposit slips have been described. It may be possible to execute the activities described herein in an order other than the order described. And, various activities described with respect to the methods identified herein can be executed in repetitive, serial, or parallel fashion. The various methods described herein provide a useful result by reducing the errors when funds are deposited with an online bank. Errors are reduced because the account information is printed on the deposit slip by a machine rather than written by hand.

Example Implementations

Figure 5:
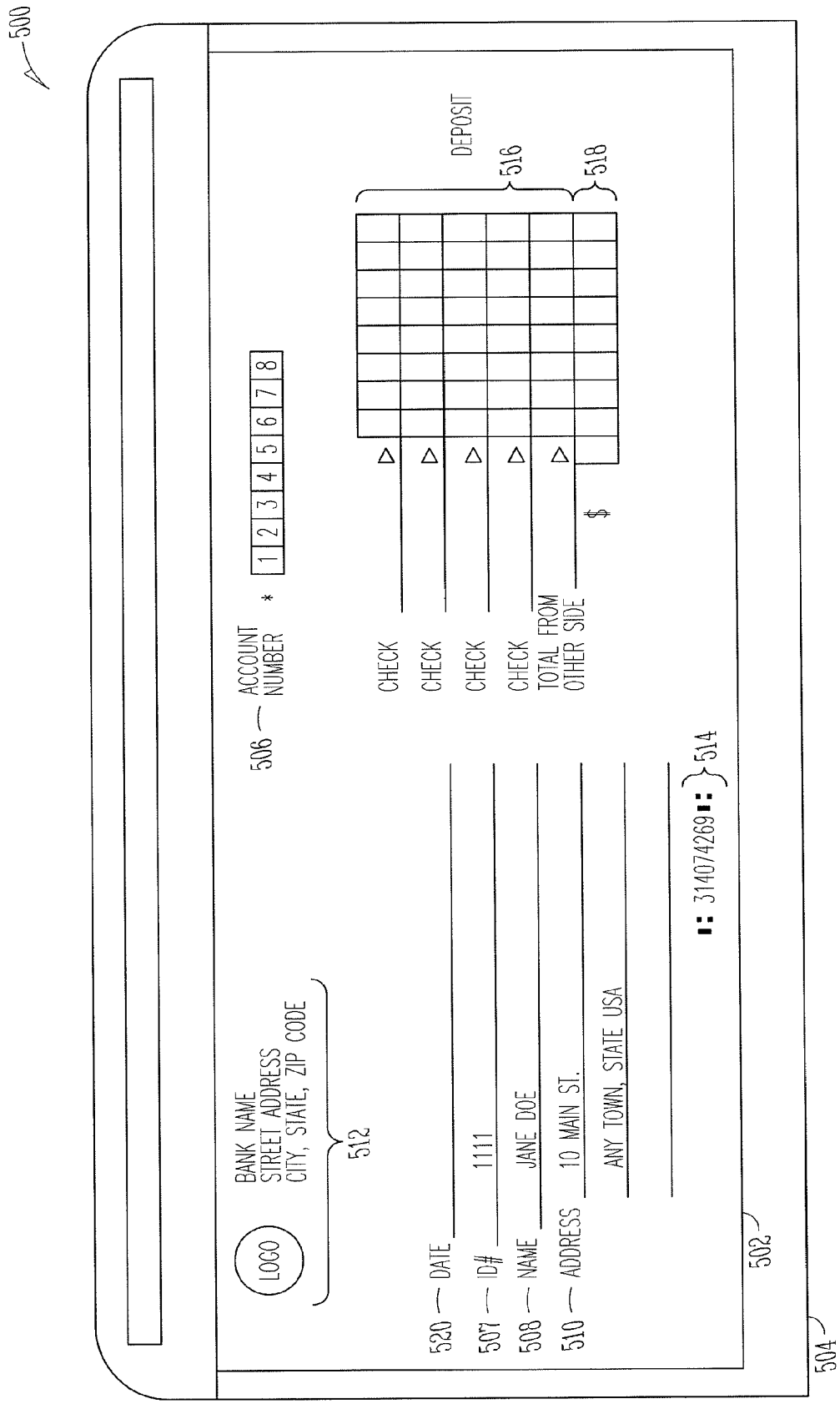
FIG. 5 is a diagram of a combined deposit slip and envelope according to an example embodiment.
Figure 6:
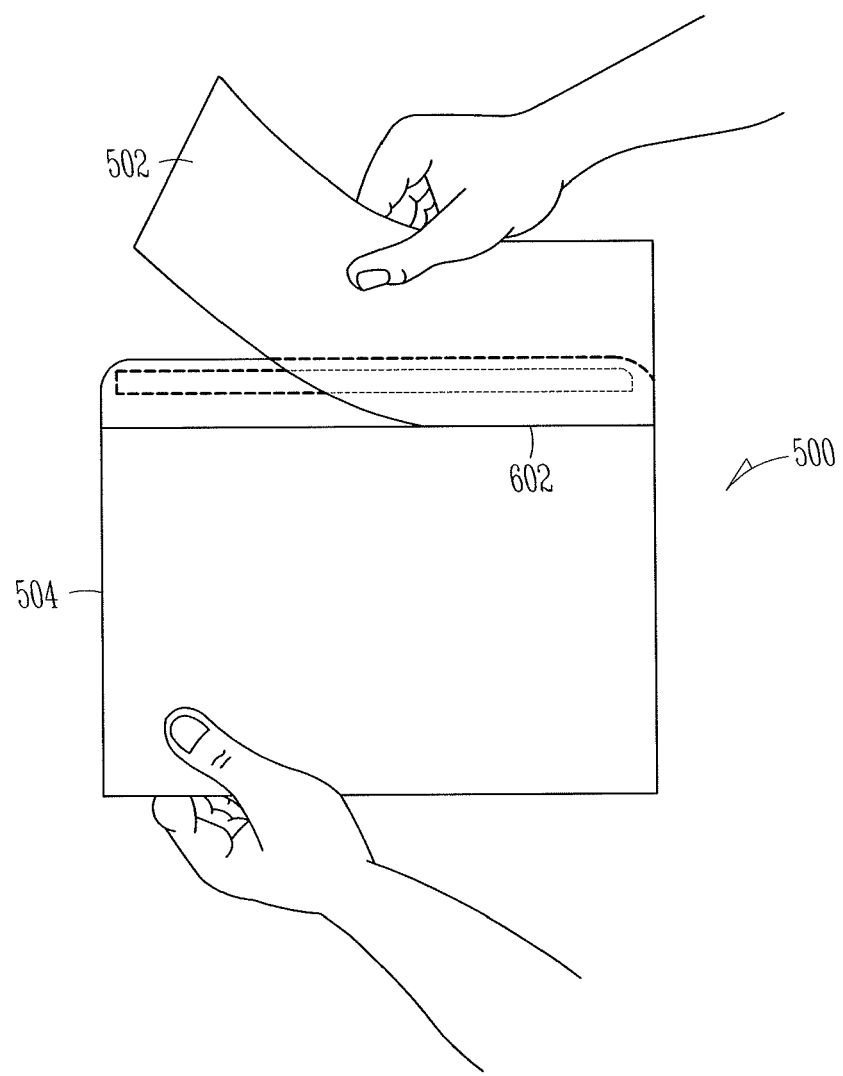
FIG. 6 is a diagram of the combined deposit slip and envelope shown in FIG. 5 according to another embodiment.
Figure 7:
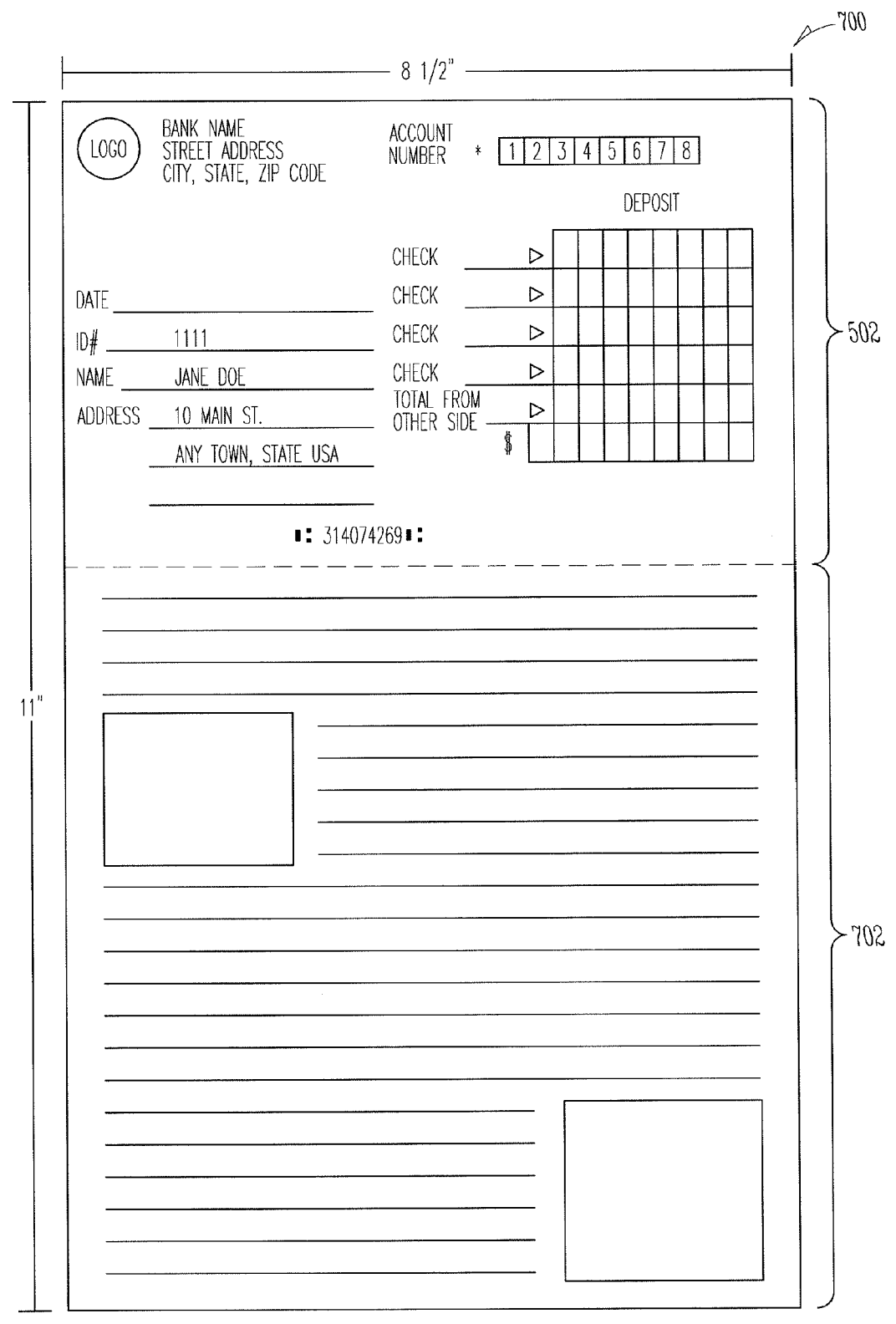

Various examples of systems and methods for embodiments of the invention have been described above. In this section, FIGS. 5 and 6 illustrate an example of a combined deposit slip envelope. FIG. 7 illustrates a representation of a customized deposit slip to be printed by a user.

FIG. 5 is a diagram of a combined deposit slip and envelope 500 according to an example embodiment. As shown in FIG. 5, a customized deposit slip 502 is detachably connected to a business envelope 504.

The customized deposit slip 502 is preprinted with various account information. The account information may include, but is not limited to an account number 506, an account name 508 and/or address 510, and bank information 512. Although the account number shown in FIG. 5 is not printed in the MICR line 514, in alternate embodiments, the account number may be preprinted in the MICR line 514 using magnetic ink. When submitting a deposit using the preprinted combined deposit slip and envelope 500 shown in FIG. 5, the customer may only need to complete the following information about the particular deposit by hand: an itemized list of the funds deposited 516, a total amount of the deposit 518, and a date of the deposit 520, or similar information.

The business envelope 504 may also have preprinted information. For example, the business envelope 504 may have the mailing address and the return address preprinted. The business envelope 504 may also have prepaid postage printed on it.

FIG. 6 is a diagram of the combined deposit slip and envelope 500 shown in FIG. 5 according to another embodiment. FIG. 6 shows the customized deposit slip 502 partially detached from the business envelope 504 along a perforated line 602. When the combined deposit slip and envelope 500 shown in FIGS. 5 and 6 is preprinted with account information and provided to a user, the user may have everything needed to submit a deposit by mail. The risk of the user not including a deposit slip is reduced because the deposit slip is attached to the deposit envelope. The risk of the user submitting an incomplete or incorrect deposit slip is also reduced because the account information is already printed on the deposit slip.

FIG. 7 is a diagram of a representation of a customized deposit slip according to one embodiment. In the example shown in FIG. 7, the representation 700 of the customized deposit slip comprises a deposit slip 502 and information not related to the deposit 702.

In one embodiment, the customized deposit slip 502 may be printed on any 8.5 inch×11 inch plain paper. The customized deposit slip 502 may be printed with just one per page, or with two or more per page. The individual deposit slip may be cut or detached from the page before use.

The information not related to the deposit 702 may be any information that the bank or third party vendor wishes to convey to the user. Some examples of information not related to the deposit may include, but are not limited to, marketing information or customer information unrelated to the deposit itself. In still another embodiment, the information may include instructions for submitting the deposit via online, mail or nearest customer location of third-party vendor providing deposit-forwarding service.

Hardware and Operating Environment

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 8 below.

Figure 8:
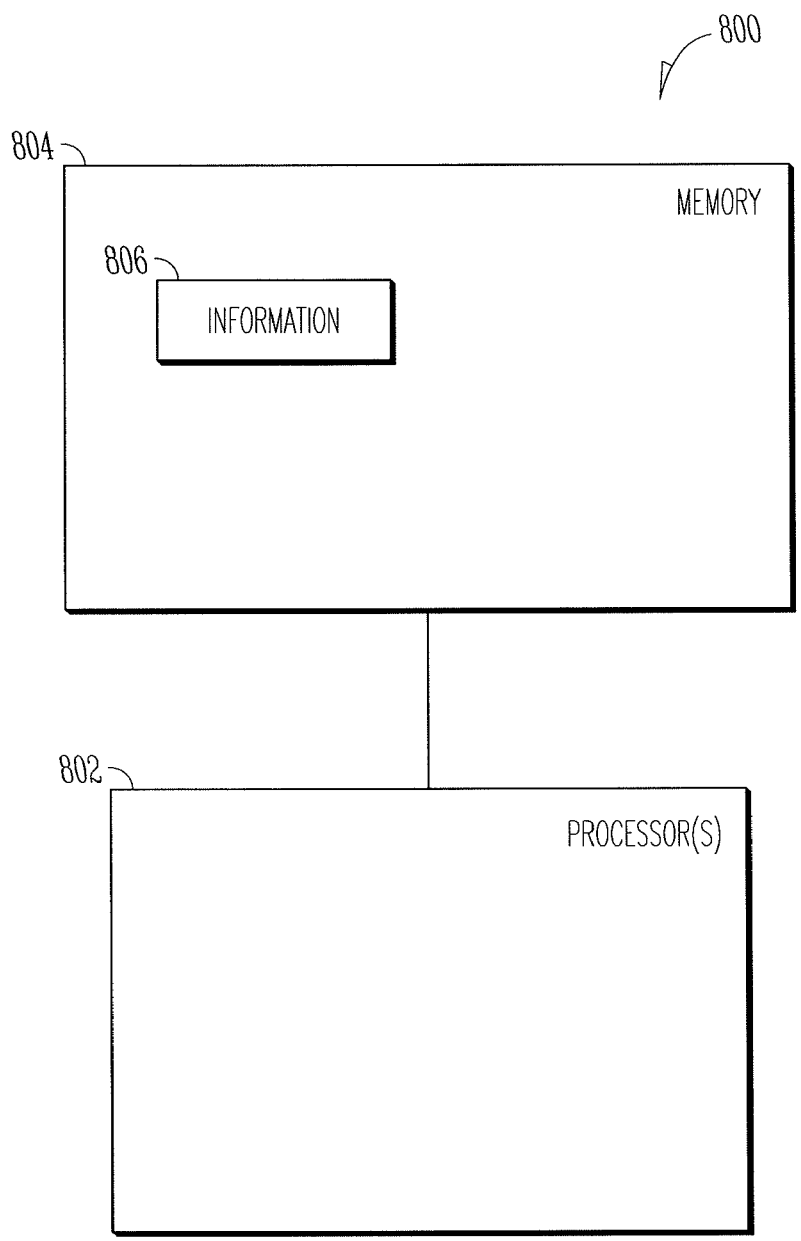
FIG. 8 is a block diagram of an article according to various embodiments.

FIG. 8 is a block diagram of an article 800 according to various embodiments of the invention. Such embodiments may comprise a computer, a memory system, a magnetic or optical disk, some other storage device, or any type of electronic device or system. The article 800 may include one or more processor(s) 802 coupled to a machine-accessible medium such as a memory 804 (e.g., a memory including electrical, optical, or electromagnetic elements). The medium may contain associated information 806 (e.g., computer program instructions, data, or both), which, when accessed, results in a machine (e.g., the processor(s) 802) performing the activities previously described herein.

Implementing the apparatus, systems, and methods disclosed herein may reduce the errors that occur when funds are deposited with an online bank. Errors are reduced because the account information, and in some embodiments deposit information, is printed on the deposit slip by a machine rather than written by hand.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A system comprising:
a memory; and
a processor in connection with the memory, the processor operable to execute software modules, the software modules comprising:
a first module operable to receive from a user an account selection for a bank account;
a second module operable to create a representation of a deposit slip customized with an account number for the account selection and non-banking information,
wherein the non-banking information comprises marketing information directed toward an account holder associated with the account number; and
a third module operable to post a deposit amount to the bank account identified by the account selection.

2. The system of claim 1 wherein the second module is further operable to calculate the deposit amount.

3. The system of claim 1 wherein the third module is further operable to post the deposit amount as a soft post.

4. The system of claim 1 wherein the second module is further operable to create the representation with the account number on the deposit slip in a location other than a magnetic ink character recognition (MICR) line.

5. The system of claim 1 wherein the second module is further operable to create the representation with a name for the user.

6. The system of claim 1 wherein the second module is further operable to create the representation with a mailing address for the user.

7. A method comprising:
receiving from a user an account selection for a bank account;
creating, by a processor, a representation of a deposit slip customized with an account number for the account selection and non-banking information,
wherein the non-banking information comprises marketing information directed toward an account holder associated with the account number; and
posting a deposit amount to the bank account identified by the account selection.

8. The method of claim 7 further comprising calculating the deposit amount.

9. The method of claim 7 wherein posting the deposit amount is performed as a soft post.

10. The method of claim 7 wherein the representation of the deposit slip is created with the account number on the deposit slip in a location other than a magnetic ink character recognition (MICR) line.

11. The method of claim 7 wherein the representation of the deposit slip comprises a name for the user.

12. The method of claim 7 wherein the representation of the deposit slip comprises a mailing address for the user.

13. An article including a machine-accessible medium having associated information, wherein the information results in a machine performing a method comprising:
receiving from a user an account selection for a bank account;
creating a representation of a deposit slip customized with an account number for the account selection and non-banking information,
wherein the non-banking information comprises marketing information directed toward an account holder associated with the account number; and
posting a deposit amount to the bank account identified by the account selection.

14. The article of claim 13 further comprising calculating the deposit amount.

15. The article of claim 13 wherein posting the deposit amount is performed as a soft post.

16. The article of claim 13 wherein the representation of the deposit slip is created with the account number on the deposit slip in a location other than a magnetic ink character recognition (MICR) line.

17. The article of claim 13 wherein the representation of the deposit slip comprises a name for the user.

* * * * *